United States Patent
Dry et al.

(10) Patent No.: US 7,261,534 B2
(45) Date of Patent: Aug. 28, 2007

(54) DUAL USE MOLDING TOOL

(75) Inventors: Alan G. Dry, Grosse Pointe Woods, MI (US); Salvatore C. DeAngelo, Shelby Township, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 330 days.

(21) Appl. No.: 10/769,377

(22) Filed: Jan. 31, 2004

(65) Prior Publication Data

US 2005/0170036 A1    Aug. 4, 2005

(51) Int. Cl.
   *B29C 45/56*    (2006.01)

(52) U.S. Cl. .................... 425/127; 156/245; 425/129.1

(58) Field of Classification Search ................ 425/112, 425/127, 129.1; 156/212, 213, 214, 245
   See application file for complete search history.

(56) References Cited

U.S. PATENT DOCUMENTS

| | | | |
|---|---|---|---|
| 3,733,161 A | 5/1973 | Nussbaum | 425/243 |
| 4,766,025 A | 8/1988 | Sanok et al. | 428/159 |
| 5,035,602 A | 7/1991 | Johnson | 425/468 |
| 5,160,690 A | 11/1992 | Cox, Jr. et al. | 264/328.1 |
| 5,437,547 A | 8/1995 | Holton et al. | |
| 5,468,141 A | 11/1995 | Iwami et al. | 425/542 |
| 5,656,234 A * | 8/1997 | Kaneishi et al. | 264/572 |
| 6,096,251 A * | 8/2000 | D'Hooren | 425/112 |
| 6,315,929 B1 | 11/2001 | Ishihara et al. | 264/2.5 |
| 6,379,143 B1 | 4/2002 | Kotaki | 425/542 |
| 6,655,945 B1 | 12/2003 | Gellert et al. | 425/130 |

* cited by examiner

*Primary Examiner*—Tim Heitbrink
(74) *Attorney, Agent, or Firm*—Bliss McGlynn, P.C.

(57) ABSTRACT

This dual use injection molding tool comprises injection molding tool with techniques for both low pressure and high pressure injection molding for injection of material into a bolster and a lifter. In the retracted, non-functional position, this tool is capable of low pressure injection molding techniques. In the extended, functional position, this tool is capable of high pressure injection molding techniques.

1 Claim, 1 Drawing Sheet

DUAL USE MOLDING TOOL

FIELD OF THE INVENTION

This invention relates to the method of making low pressure injection molding (hereinafter referred to as LPIM) covered and high pressure injection molding (hereinafter referred to as HPIM) uncovered parts. More specifically, this invention relates to LPIM covered and HPIM uncovered parts from the same molding tool.

BACKGROUND OF THE INVENTION

In the motor vehicle industry, currently high line vehicles are specified to have covered bolsters while low line vehicles are specified to have uncovered bolsters. Both high line and low line vehicles bolsters are generally specified to be of the same geometry. The low line vehicles utilize HPIM uncovered parts and the high line vehicles utilize LPIM covered parts. This has been a problem in the industry because it has been necessary to have separate tools for the low line and high line vehicles, even though they may be of the same geometry.

If a LPIM tool is used in making HPIM uncovered parts, then the molten plastic will vent from the unfilled shut-off edge. This venting will ultimately defeat the molding process. This invention solves that problem by utilizing a lifter that allows for both low pressure and high pressure injection molding from the same tool without having the problem of molten plastic vent from the unfilled shut-off edge.

SUMMARY OF THE INVENTION

This invention relates to a dual use injection molding tool comprising an injection molding tool and a lifter wherein the injection molding tool includes techniques for both low pressure and high pressure injection molding for injection of material to form a bolster. The lifter is disposed along the peripheral edge of a bolster and adapted to actuate between a retracted, non-functional position and an extended, functional position.

When the injection molding tool is being used for LPIIM, the lifter is in its retracted, non-functional position. When the injection molding tool is being used for HPIM, the lifter is in its extended, functional position. Utilizing this lifter will prevent the common venting problem that typical injection molding tools encounter when the tool is used to form both LPIM and HPIM parts.

This invention may reduce the number of bolster or other covered/non-covered part tooling by as much as 50%. This dual use injection molding tool when used for non-covered bolsters can be used again to provide covered bolsters later in the parts program without the need for additional tooling. Ultimately, the dual use injection molding tool of the present invention reduces costs associated with double-tooling as well as those associated with correcting the problem of molten plastic material, venting from the unfilled shut-off edge.

DETAILED DESCRIPTION OF THE DRAWINGS

DETAILED DESCRIPTION OF THE PREFERRED EMBODIMENT

Figure 1:
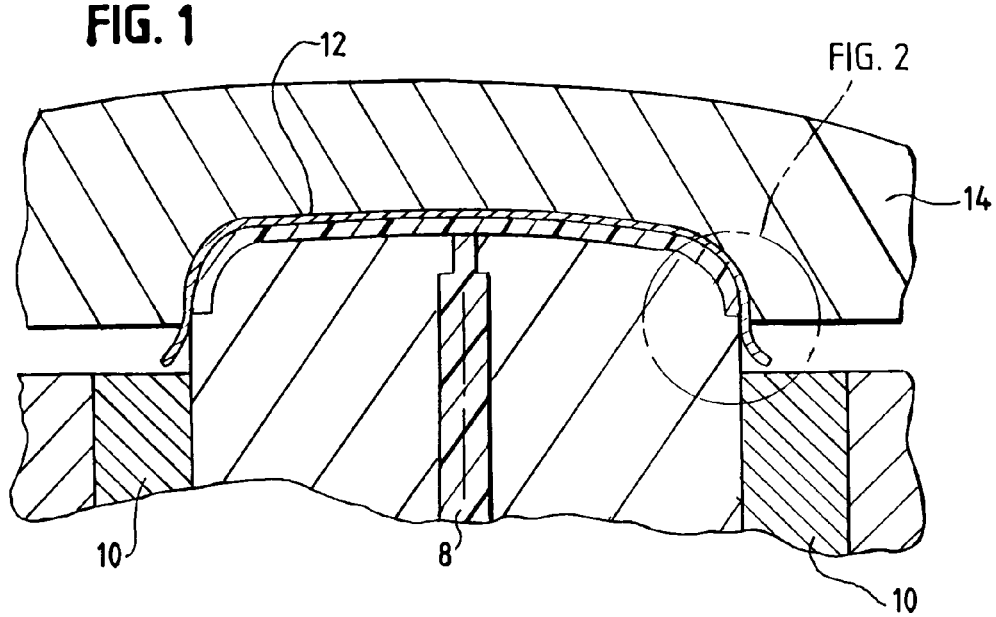
FIG. 1 is a view of the dual use injection molding tool in its LPIM position.
Figure 2:
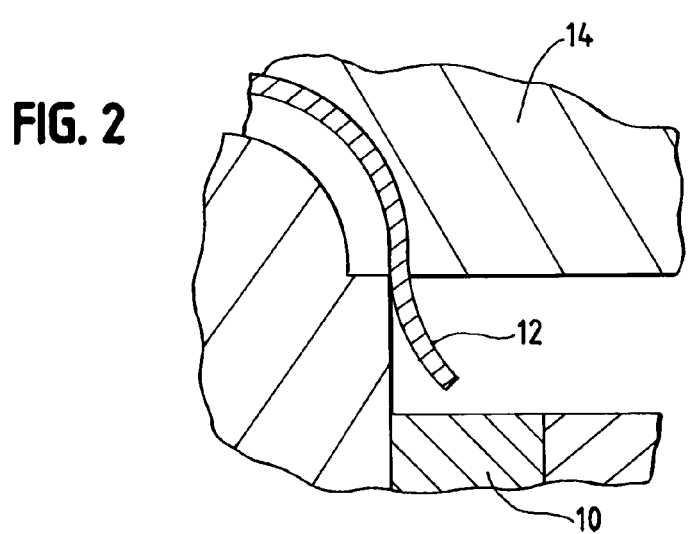
FIG. 2 is a detailed view of the dual use injection molding tool in its LPIM position.
Figure 3:
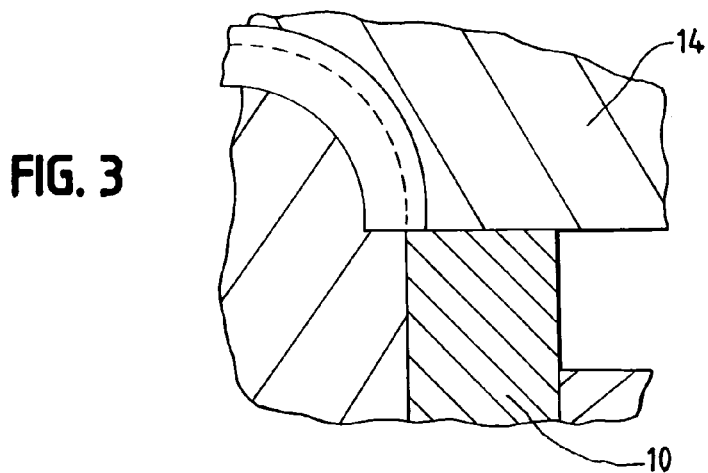
FIG. 3 is a view of the dual use injection molding tool in its HPIM position.

The invention relates to an injection molding tool capable of performing both LPIM and HPIM techniques. This dual use injection molding tool comprises an injection molding tool 8 with techniques for both low pressure and high pressure injection molding of material into a bolster 14 and a lifter 10. This lifter 10 further comprises a retracted, non-functional position as seen in FIG. 1 and FIG. 2 and an extended, functional position as seen in FIG. 3. The lifter 10 is located on the periphery edge of the bolster 14.

Referring to FIG. 1 and FIG. 2, the lifter 10 is in its retracted, non-functional position. In this position, the injection molding tool 8 will properly perform the LPIM functions. Cover-stock 12 will be easily added to produce the desired effect for high-line vehicles.

Referring to FIG. 3, the lifter 10 is in its extended, functional position. This lifter 10 is moved and locked into this extended, functional position. This allows the same injection molding tool 8 that was used for LPIM to be used for HPIM. The lifter 10, will prevent the material, usually molten plastic, that has be injected from venting into the unfilled shut-off edge that usually will defeat the molding process.

By utilizing a lifter 10 in conjunction with an injection molding tool 8 that is capable of performing both LPIM and HPIM functions, both covered and uncovered parts can be easily made from the same injection molding tool 8.

In its preferred embodiment, the lifter 10 will be able to be moved and locked into either the retracted, non-functional or extended, functional position at the start of the part run. That occurs when the injection molding tool 8 is in between the LPIM and HPIM mode.

This dual use injection molding tool avoids double-tooling and allows the same injection molding tool 8 to be used to produce two types of parts, covered and uncovered. This dual use injection molding tool may reduce the number of bolster or other cover/non-covered part tooling. This significantly reduces the costs that additional tooling may have.

The above presents a description of the best mode contemplated for carrying out this invention. The claims should not be read as limited to the described order or elements unless stated to that effect. Therefore, all embodiments that come with the scope and spirit of the following claims and equivalents thereto are claimed as the invention.

What is claimed is:

1. A dual use injection molding tool comprising:
   injection molding tool having a mold cavity and adapted to inject molten thermoplastic material into said mold cavity through both low pressure and high pressure injection molding techniques, said mold cavity adapted to form a bolster having a cover-stock adapted for use in connection with an interior trim component for a vehicle; and
   a lifter operatively engaged to said injection molding tool and disposed along the periphery of said mold cavity, said lifter adapted to actuate between a retracted, non-functional position for low pressure injection of molten thermoplastic into said mold cavity and an extended, functional position, for high pressure injection of molten thermoplastic into said mold cavity, wherein said molding tool and the cover-stock cooperate to prevent molten thermoplastic from venting along the periphery of said mold cavity when a low pressure injection molding technique is employed and said lifter is actuated in an extended position to prevent molten thermoplastic from venting along the periphery of said mold cavity when a high pressure molding technique is employed.

\* \* \* \* \*